(12) United States Patent
Ickert et al.

(10) Patent No.: US 9,266,635 B2
(45) Date of Patent: Feb. 23, 2016

(54) METHOD AND SEALING STATION FOR SEALING PACKAGING UNITS

(75) Inventors: Lars Ickert, Kempten (DE); Andreas Mader, Dietmannsried (DE); Bernhard Langer, Bad Groenenbach (DE)

(73) Assignee: MULTIVAC SEPP HAGGENMUELLER GMBH & CO. KG, Wolfertschwenden (DE)

( * ) Notice: Subject to any disclaimer, the term of this patent is extended or adjusted under 35 U.S.C. 154(b) by 785 days.

(21) Appl. No.: 13/531,385

(22) Filed: Jun. 22, 2012

(65) Prior Publication Data
US 2012/0324835 A1 Dec. 27, 2012

(30) Foreign Application Priority Data
Jun. 24, 2011 (DE) .......... 10 2011 105 513

(51) Int. Cl.
| B65B 65/02 | (2006.01) |
| B65B 7/01 | (2006.01) |
| B65B 7/00 | (2006.01) |
| B65B 51/14 | (2006.01) |
| B65B 7/16 | (2006.01) |
(Continued)

(52) U.S. Cl.
CPC ........... B65B 51/14 (2013.01); B29C 66/92445 (2013.01); B29C 66/92921 (2013.01); B65B 7/164 (2013.01); B65B 31/028 (2013.01); B29C 65/749 (2013.01); B29C 65/7451 (2013.01); *B29C 65/787* (2013.01); *B29C 66/112* (2013.01); *B29C 66/131* (2013.01); *B29C 66/53461* (2013.01); *B29C 66/8161* (2013.01); *B29C 66/83221* (2013.01); *B29C 66/849* (2013.01); *B29C 66/9672* (2013.01); *B29C 66/9674* (2013.01)

(58) Field of Classification Search
CPC ........ B65B 7/164; B65B 7/28; B65B 7/2878; B65B 51/10; B65B 51/14; B65B 31/028; B29C 65/7451; B29C 65/749; B29C 65/787; B29C 66/112; B29C 66/131; B29C 66/53461; B29C 66/8161; B29C 66/83221; B29C 66/849; B29C 66/92921; B29C 66/9672; B29C 66/9674; B29C 66/92445
USPC ................ 53/478, 329, 329.5, 484, 485
See application file for complete search history.

(56) References Cited

U.S. PATENT DOCUMENTS

| 3,345,797 A | 10/1967 | Von Stoeser |
| 5,718,101 A * | 2/1998 | Noel et al. ............... 53/432 |

(Continued)

FOREIGN PATENT DOCUMENTS

| DE | 7305441 U | 9/1973 |
| DE | 2538316 B2 | 3/1977 |

(Continued)

*Primary Examiner* — Thanh Truong
*Assistant Examiner* — Dianne Mitchell
(74) *Attorney, Agent, or Firm* — Husch Blackwell LLP (57) ABSTRACT

The invention relates to a method for sealing at least a packaging unit by means of a sealing tool lower part carrying the packaging unit, a sealing tool upper part, and a sealing plate. The sealing tool lower part is configured to perform a lifting movement by means of a drive. The invention is characterized in that the lifting movement is performed in a uniform, continuous motion from a lowered position, via an intermediate position in which a packaging unit is clamped, to a final position. The invention further relates to a sealing station for a packaging machine in which the sealing plate is suspended via a damping unit at the sealing tool upper part.

15 Claims, 7 Drawing Sheets

(51) Int. Cl.
  *B65B 31/02*   (2006.01)
  *B29C 65/74*   (2006.01)
  *B29C 65/78*   (2006.01)
  *B29C 65/00*   (2006.01)

(56) References Cited

U.S. PATENT DOCUMENTS

| | | | |
|---|---|---|---|
| 7,712,289 B2* | 5/2010 | von Seggern | 53/510 |
| 2001/0022065 A1 | 9/2001 | Torre | |
| 2004/0098947 A1* | 5/2004 | Konishi | 53/329.5 |
| 2005/0134125 A1* | 6/2005 | Kim | 310/58 |
| 2005/0257501 A1* | 11/2005 | Natterer | 53/432 |
| 2006/0048480 A1* | 3/2006 | Konishi | 53/329.3 |
| 2008/0148690 A1* | 6/2008 | Seggern | 53/433 |
| 2009/0288365 A1* | 11/2009 | Negele | 53/329 |
| 2010/0307110 A1* | 12/2010 | Wilhelm et al. | 53/329.2 |
| 2011/0167762 A1* | 7/2011 | Holzem et al. | 53/329 |
| 2011/0289889 A1* | 12/2011 | Kohanski et al. | 53/485 |
| 2013/0318919 A1* | 12/2013 | Neale et al. | 53/329.2 |

FOREIGN PATENT DOCUMENTS

| | | |
|---|---|---|
| DE | 19740988 A1 | 3/1999 |
| DE | 10031356 A1 | 1/2002 |
| DE | 102008023319 A1 | 11/2009 |
| DE | 102008052423 A1 | 4/2010 |
| GB | 1083578 A | 9/1967 |

\* cited by examiner

METHOD AND SEALING STATION FOR SEALING PACKAGING UNITS

CROSS-REFERENCE TO RELATED APPLICATION

This application claims priority to German Application Number 102011105513.8 filed Jun. 24, 2011 to Lars Ickert, Andreas Mader and Bernhard Langer entitled "Method and Sealing Station for Sealing Packaging Units," currently pending, the entire disclosure of which is incorporated herein by reference.

BACKGROUND

Respective methods and sealing stations are known, for example, from DE 10 2008 023 319 A1 or DE 10 2008 052 423 A1. A hermetically sealed chamber is usually formed between a sealing tool upper part and a sealing tool lower part in order to be able to evacuate and/or to fumigate (i.e. to flush with gas) the packaging units to be sealed. A tray carrier carrying the packaging units can be lifted in order to drive the trays and a top film lying upon these trays against a sealing tool. The top film is sealed onto the trays by the heat of the sealing plate and the pressure created when pressing the sealing tool upper part onto the tray carrier.

SUMMARY OF THE INVENTION

The object of the present invention is to improve previous methods and sealing stations by means as structurally simple as possible in terms of a faster sealing process, while simultaneously at least maintaining or even improving the quality of a sealing seam produced during the sealing action.

This object is satisfied by a method having the features of claim 1 and by a sealing station having the features of claim 7. Advantageous developments of the invention are disclosed in the dependent claims.

The method according to the invention provides that the a lifting movement of the sealing tool lower part is performed in a uniform, continuous motion from a lowered position receiving the packaging unit, via an intermediate position in which the packaging unit is clamped between the sealing tool lower part and the sealing plate, to an upper final position in which the sealing tool lower part and the sealing plate are jointly lifted in relation to the intermediate position by means of the drive. Due to the lifting movement being performed in a uniform, continuous motion, the halt of the packaging unit, previously always necessary during evacuation and/or fumigation, is eliminated. It thereby also eliminates the braking necessary for a halt and the re-acceleration of the packaging unit. This results firstly in a time gain, i.e. a shortened time period for the sealing process, and secondly in energy savings, since the energy for braking and accelerating is eliminated.

Nevertheless, the invention can ensure a sufficiently long sealing time and a corresponding quality of the sealing seam. This is achieved in that the sealing tool lower part and the sealing plate are moved quasi as a "packet" from the intermediate position to the higher final position and during this phase receive the packaging unit between them. In this manner, the entire time period of the movement from the intermediate position to the final position is available for the sealing action—optionally also the time of a reverse movement from the final position back into the intermediate position. In addition, the sealing time could, if necessary, be arbitrarily extended by a suitable halting time in the final position.

The invention is above all particularly advantageous, in that the force of the lifting mechanism or the drive for the sealing tool lower part, respectively, can be used for achieving a contact pressure during the sealing action. For example, a relatively inexpensive AC (alternate current) motor having a spindle drive can be used as a drive for the sealing tool lower part. Even if the sealing tool lower part in the intermediate position has impacted the sealing plate and subsequently entrains it, the relatively high inertia of the components of the AC motor and the force of impact of the sealing tool lower part onto the sealing plate provide for sufficiently high sealing forces.

Preferably, a damping unit is provided which dampens or absorbs the movement of the sealing plate relative to the sealing tool upper part. This damping unit provides for a suitable counter-pressure of the sealing plate at the packaging unit to be sealed. In addition, the damping unit can absorb the kinetic energy of the sealing tool lower part and the sealing plate and convert it into potential energy. After passing through the final position or after an optional halting time in the final position, respectively, the damping unit can again deliver the stored potential energy in the form of kinetic energy to the sealing plate and the sealing tool lower part, it can thus accelerate these two components downwardly. In this manner, the energy efficiency of the method according to the invention is further enhanced.

It is advantageous to have a hardness or a flexibility of the spring of the damping unit increase sharply in the final position of the sealing tool lower part and the sealing plate. This could be achieved in that the damping unit, for example, comprises one or more coil springs or disk springs, which upon reaching the final position run into total compression, meaning that the distances between the elements of the spring are reduced to zero. The sharp increase of the hardness or the flexibility of the spring of the damping unit can define the final position and prevent a potentially undesirable direct contact between the sealing plate and the sealing tool upper part.

In one embodiment, a top film is clamped between the sealing tool lower part and a clamping frame prior to reaching the intermediate position. This has the advantage that the position of the top film is stabilized relative to the packaging tray. In this, the clamping frame could be elastically suspended at the sealing tool upper part.

During the lifting movement of the sealing tool lower part, the top film can optionally be severed. This could in particular occur during the movement from the intermediate position to the final position. This would provide the advantage that the packaging unit is at the end of the sealing process already separated and no longer is attached to other packaging units by the top film.

If an option to extend the sealing time is to be provided, a provision could be taken to keep the sealing tool lower part and the sealing plate in the upper final position by means of a possible variably predeterminable halting time. For this purpose, a lock could be provided for the sealing tool lower part, for example, a releasable catch mechanism which engages with the sealing tool lower part in the final position. Additionally or alternatively, a temporarily activatable brake acting upon the drive could be provided for temporarily holding the sealing tool lower part in its final position.

The invention also relates to a sealing station for a packaging machine, which can advantageously be configured for performing a method of the kind prescribed. This sealing station comprises a sealing tool lower part receiving a packaging unit, a sealing tool upper part, and a sealing plate, where a drive is provided for actuating a lifting movement of the sealing tool lower part. The sealing plate is suspended via a damping at the sealing tool upper part in order to in a sealing position be able to participate in the lifting movement of the sealing tool lower part while clamping the packaging unit between itself and the sealing tool lower part. As already described above, this offers the advantage of being able to use the joint lifting movement of the sealing tool lower part and the sealing plate for the sealing action. The damping unit additionally provides the advantage of being able to generate counter-pressure of the sealing plate, to store and again deliver the kinetic energy of the sealing tool lower part and the sealing plate in order to thus improve energy efficiency of the sealing station.

Advantages were also described above, which can result when the damping unit is configured as to sharply increase its hardness or its flexibility of the spring in the final position of the sealing tool lower part and the sealing plate.

The damping unit can comprise a spring element, a rubber-elastic element, an air damper, an air spring and/or a hydraulic cylinder and components. Passive damping elements such as spring elements or rubber-elastic elements are in this respect particularly simple.

If a clamping frame is provided at the sealing tool upper part moveable relative to the latter, for clamping a top film between the sealing tool lower part and the clamping frame, then the position of the top film can in this manner be stabilized, and the sealing quality can thus be improved.

The clamping frame could in particular be flexibly supported at the sealing tool upper part, in order to thus be entrained during the lifting movement of the sealing tool lower part and to simultaneously be able to exert constant clamping forces.

If a guide is provided for guiding the movement of the sealing plate relative to the sealing tool upper part, then the movement of the sealing plate is defined more precisely. In particular canting or lateral displacement of the sealing plate can thereby be prevented.

In a further improvement of the sealing station, a cutting knife for severing a sealing film is attached at the sealing tool lower part or at the sealing tool upper part. This attachment could in particular be rigid. This would have the advantage that a dedicated actuator for the cutting blade can be omitted.

A stop is preferably provided for determining the final position of the sealing plate. If the sealing plate runs against this stop, then it has reached its final position. This stop can be mounted at the sealing tool upper part.

For enabling, by means of a halting time possibly being variably adjustable, that the sealing tool lower part and the sealing plate can remain in the final position, a lock for locking the sealing tool lower part in its final position and/or a brake acting upon the drive can be provided. As explained, the lock can for example be a releasable catch element.

It has proven to be advantageous, if a motor with an integrated spindle is provided as a drive or lifting actuator for the sealing tool lower part. In the context of the invention, this means that the motor drives the spindle to a lifting movement, for example, by rotating a spindle nut which is in engagement with the spindle. The spindle can in particular penetrate the motor. Preferably, an asynchronous motor, for example, an AC motor is provided as a motor. This configuration has an overall advantage that relatively high inertia forces are present, which can be used indirectly to generate high sealing pressure.

Finally, the invention also relates to a packaging machine which is configured for performing a method of the kind described above and/or a sealing station of the kind described above.

A great advantage of the invention is that the drive for the lifting movement of the sealing tool lower part can be the only actuator or drive in the entire sealing station. It would not be required, that a further drive be provided for effecting a closing movement of the sealing tool lower part and the sealing tool upper part, or that there be another drive for moving a cutting blade.

A further advantage of the sealing station according to the invention is that it can optionally be dispensed with forming a hermetically sealed chamber between the sealing tool lower part and the sealing tool upper part. Even without such a hermetically closed chamber, the top film could be securely fixed for example by means of the clamping frame. By avoiding the need for a hermetically sealed chamber, the sealing station according to the invention is structurally very simple. In addition, the process is accelerated because the time required for closing a hermetically sealed chamber can be eliminated.

Other and further objects of the invention, together with the features of novelty appurtenant thereto, will appear in the course of the following description.

DESCRIPTION OF THE SEVERAL VIEWS OF THE DRAWING

In the accompanying drawing, which forms a part of the specification and is to be read in conjunction therewith in which like reference numerals are used to indicate like or similar parts in the various views.

Identical components are in the figures designated throughout with the same reference numerals.

DETAILED DESCRIPTION OF THE INVENTION

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

Figure 1:
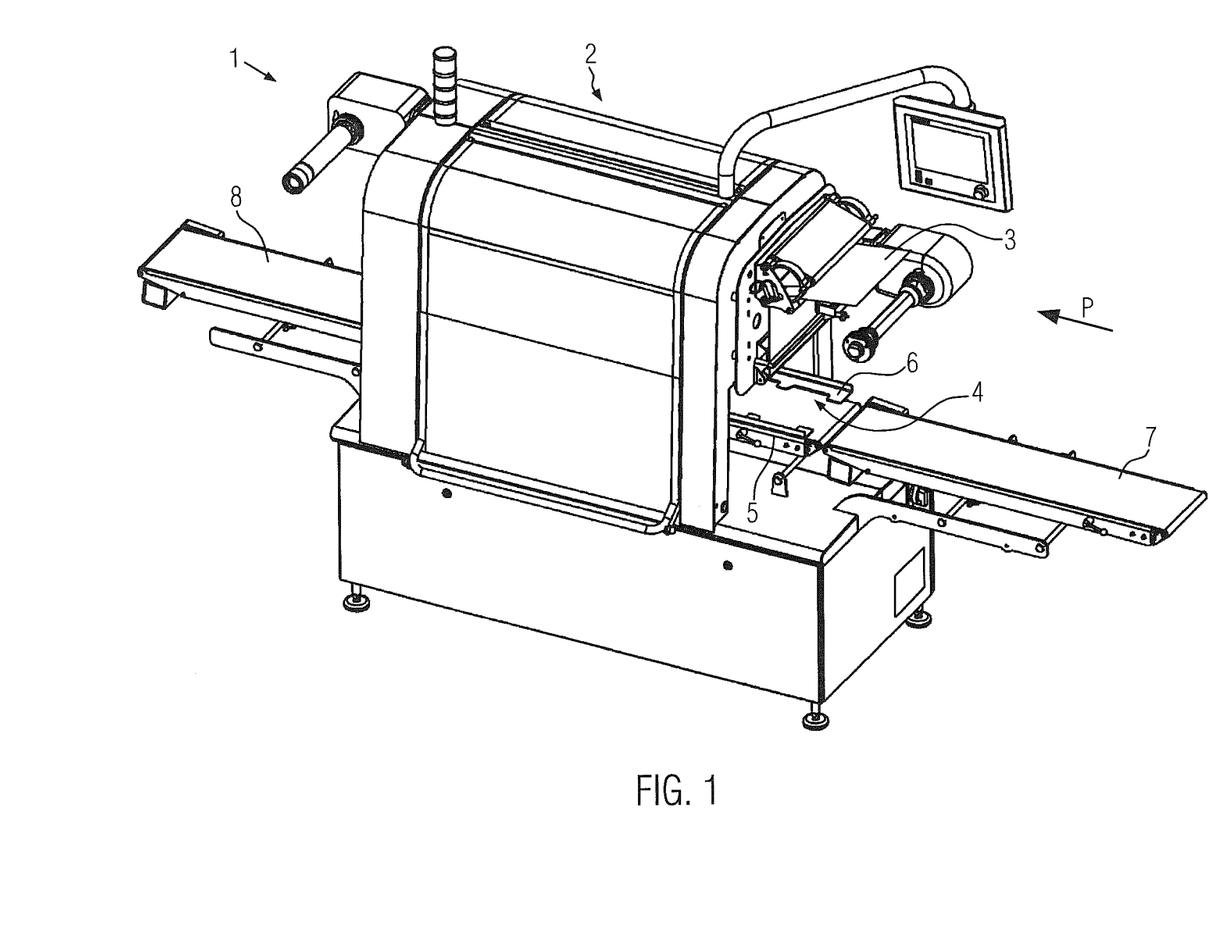
FIG. 1 is a side perspective view of a sealing station of a tray sealer in accordance with one embodiment of the present invention.

FIG. 1 shows a tray sealer 1 as an example of a packaging machine according to the invention comprising a sealing station 2, in which trays (not shown) are sealed with a top film 3 A gripper system 4 with a first gripper arm 5 and a second gripper arm 6 is provided to convey trays in a production direction P from a feed conveyor 7 into the sealing station 2. After the sealing process in the sealing station 2, the sealed trays are by means of the gripper system 4 conveyed out from the sealing station 2, placed on a discharge belt 8 and supplied to further process steps.

Figure 2:
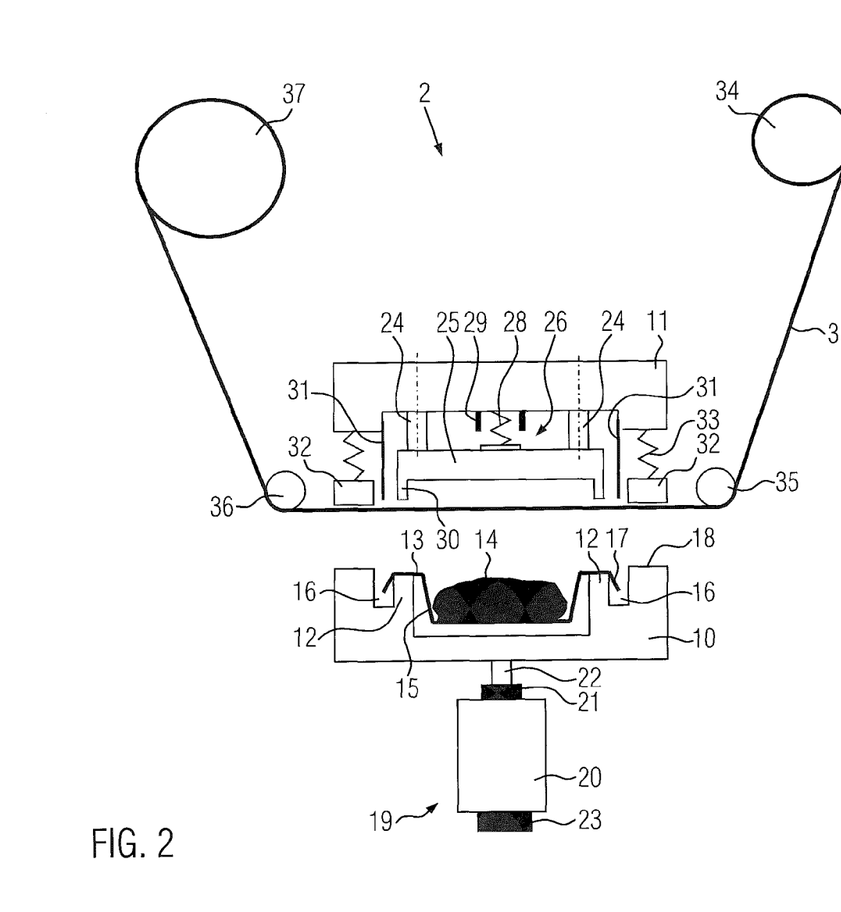
FIG. 2 is a schematic representation of the components of the sealing station in vertical section in accordance with one embodiment of the present invention.

FIG. 2 shows the sealing station in a schematic vertical section perpendicular to the production direction P (see FIG. 1). The sealing station 2 comprises a sealing tool lower part 10 and a sealing tool upper part 11. The sealing tool lower part 10 is embodied as a tray carrier. For this purpose, it comprises a tray supporting edge 12 on which the edge 13 of a tray 15 filled with a product 14 can rest. The tray carrier edge 12 extends around the tray 15 and can be closed in a ring-shape or otherwise have individual interruptions.

On the outside of the tray edge 12, the sealing tool lower part 10 comprises a likewise ring-shaped groove 16 into which a downwardly angled outer end 17 of the tray edge 13 can catch. Outside of this groove 16, there is in turn a shoulder 18 slightly raised over the tray carrier edge 12.

Below the sealing tool lower part 10, a drive 19 is arranged, which as a lifting drive is designed to effect a lifting movement of the sealing tool lower part 10. The lifting drive 19 comprises a motor 20, for example, an AC motor. It is designed to rotate a spindle nut 21, which is in engagement with a spindle 22, which in turn is fixedly connected with the sealing tool lower part 10. A rotation of the spindle nut 21 caused by the motor 20 thus leads to a lifting movement of the spindle 22, which is also transmitted as a lifting movement to the sealing tool lower part 10. An optionally provided brake 23 can act upon the motor 20, the spindle nut 21, or the spindle 22 in order to inhibit the lifting movement of the spindle 22 and to thus fix the sealing tool lower part 10 in a specific position.

The sealing tool upper part 11 is located above the sealing tool lower part 10. There are guides 24 protruding downwardly from the bottom side of the sealing tool upper part 11, two of which are shown in FIG. 2. On the guides 24, there is a sealing plate or a sealing frame 25, respectively, which is movable along the guide 24 in the vertical direction and is heatable for reaching a sealing temperature. A damping unit 26 is provided for dampening the movement of the sealing plate 25 vis-à-vis the sealing tool upper part 11. In the present embodiment, the damping unit 26 comprises a disc or coil spring 28. Furthermore, e.g. a sleeve-shaped stop 29 is provided on the underside of the sealing tool upper part 11 in order to restrict the vertical movement of the sealing plate 25 relative to the sealing tool upper part 11. Sealing edges 30 extend downwardly from the outer side of the sealing plate 25. The contour of the sealing edges 30 largely corresponds to the contour of the tray carrier edge 12 of the sealing tool lower part 10.

Furthermore, a cutting blade 31 is rigidly attached at the sealing tool upper part. It extends downwardly from the sealing tool upper part 11. The contour or outer dimension, respectively, of the cutting blade 31 corresponds to the shape or the contour of the groove 16 in the sealing tool lower part 10.

Outside of the cutting blade 31, a clamping frame 32 is suspended via spring members 33 at the sealing tool upper part 11. The course of the clamping frame 32 corresponds to the course of the shoulder 18 of the sealing tool lower part 10.

The top film 3 used for sealing the tray 15 can be drawn from a film roll 34. First and second deflection rollers 35, 36, deflect the top film 3 such that it runs through the sealing station 2 between the sealing tool lower part 10 and the sealing tool upper part 11 in the horizontal direction. Beyond the sealing station 2, a residual film winder 37 provides for winding up the residual film lattice of the top film 3

The operation of the sealing station 2 or an embodiment of the method according to the invention will now be explained with reference to FIGS. 2 to 7.

FIG. 2 shows the sealing station 2 in an opened position. In this, a tray 15 is received in the sealing tool lower part 10. The edge 13 of tray 15 is supported and carried by the tray carrier edge 12.

Figure 3:
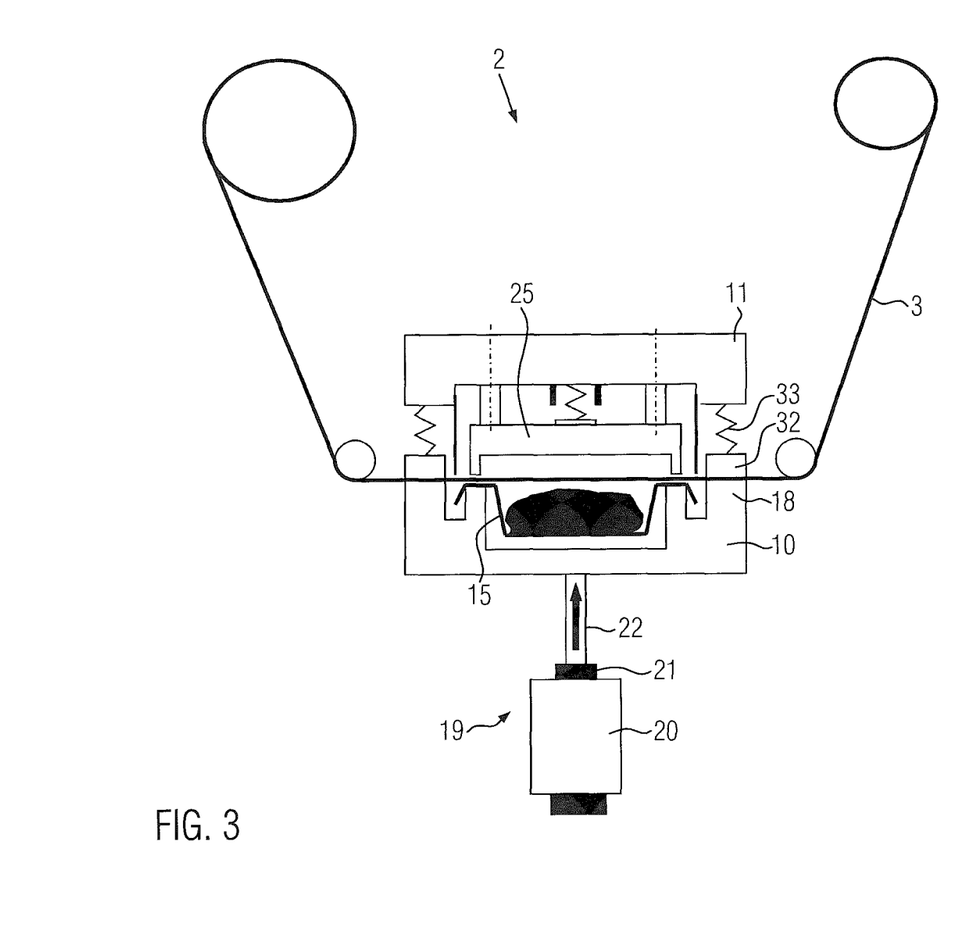
FIG. 3 is a schematic representation of the components of the sealing station, just before reaching the intermediate position.

As shown in FIG. 3, the drive 19 is now activated to effect a lifting movement of the sealing tool lower part 10. For this purpose, the AC motor 20 is energized to rotate the spindle nut 21 and thereby drive the spindle 22 with the sealing tool lower part 10 upwardly. FIG. 3 shows the situation in which the shoulder 18 of the sealing tool lower part 10 comes in contact with the clamping frame 32 for clamping the top film 3 between the shoulder 18 and the clamping frame 32. It can be seen that the edge 13 of tray 15 at this time is not yet contacted by the sealing plate 25, as the tray carrier edge 12 is lower than the shoulder 18. It can also be seen that in contrast to conventional sealing stations, a net hermetically sealed chamber is has not yet formed around the edge 13 of the tray 15 in this position.

Figure 4:
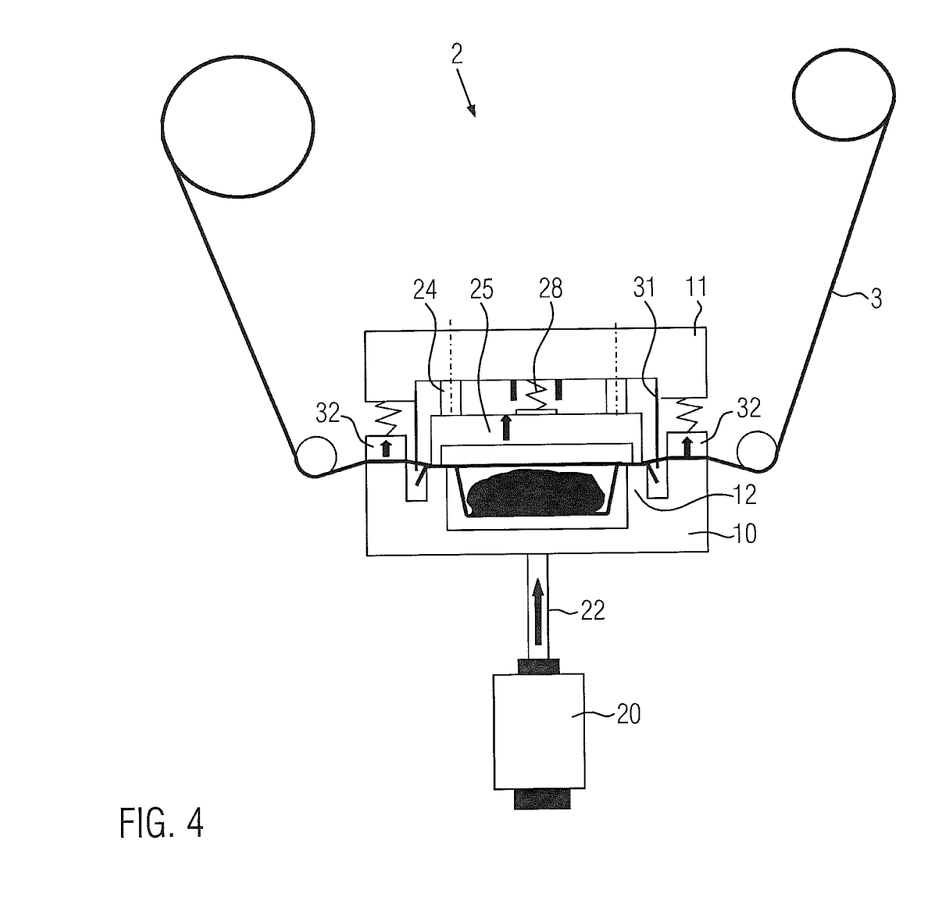
FIG. 4 is a schematic representation of the components of the sealing station when reaching the intermediate position.

In FIG. 4, the arrow at the spindle 22 shows that it is further moved upwardly by the motor 20. In this, a so-called "intermediate position" is reached in FIG. 4, in which the packaging unit or the tray 15, respectively, is clamped between the tray carrier edge 12 and the sealing plate 25. An arrow on the sealing plate 25 indicates that the sealing plate 25 is during the further lifting movement of the sealing tool lower part 10 entrained by the latter and guided upwardly. In this, the sealing plate 25 moves against the damping force of the damping unit 26 along the guides 24. Arrows on the clamping frame 32 indicate that it is likewise moved upwardly—carried by the shoulder 18 of the sealing tool lower part 10. This causes an inclined position of the unclamped region of the top film 3 between the clamping frame 32 and the sealing plate 25. Due to this inclined position, the respective region of the top film 3 comes in contact with the cutting blade 31.

Figure 5:
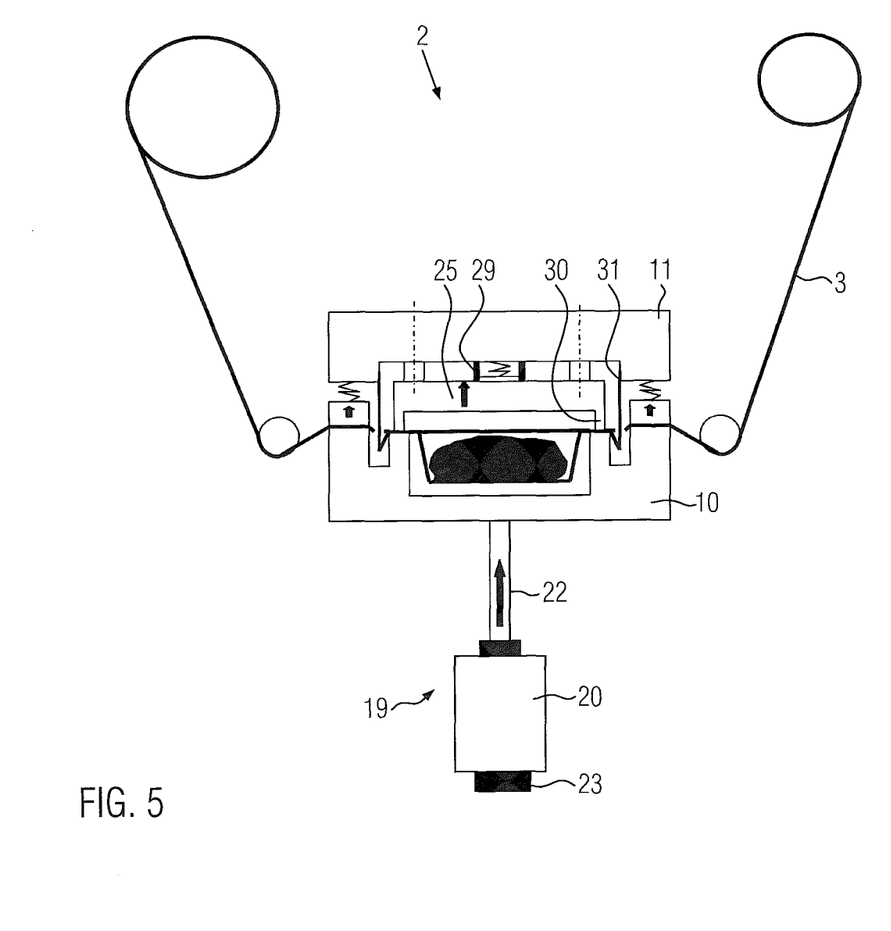
FIG. 5 is a schematic representation of the components of the sealing station when reaching the final position.

The further lifting movement of the lifting drive 19 finally causes the top film 3 to be severed at the cutting blade 31, as shown in FIG. 5. In addition, FIG. 5 shows that the upper side of the sealing plate 25 contacts the stop 29. The sealing plate 25 has reached its upper final position in which it cannot be moved upwards any further. Additionally or alternatively to stop 29, the elements of the spring 28 could also be totally compressed, i.e., in abutment with one another in order to prevent further upwardly movement of the sealing plate 25.

Already starting from the intermediate position (see FIG. 4), the sealing tool lower part 10 presses the top film 3 in the region of the tray carrier edge 12 against the sealing edge 30 of the sealing plate 25. Under the action of this pressure and the heat of the sealing edges 30, sealing the top film 3 with the tray 15 thus starts from the intermediate position. Upon reaching the final position (FIG. 5), as explained, any further upwardly movement of the sealing plate 25 is blocked. Simultaneously, however, the inertia of the components of the drive 19 (i.e. the motor 20 and the spindle 22) as well as the sealing tool lower part 10 continue to press upwardly. In this manner, very high short-term sealing pressure is reached. In order to further extend the sealing time, the brake 23 can optionally be activated to lock the spindle 22 and the sealing tool lower part 10 in the final position.

Figure 6:
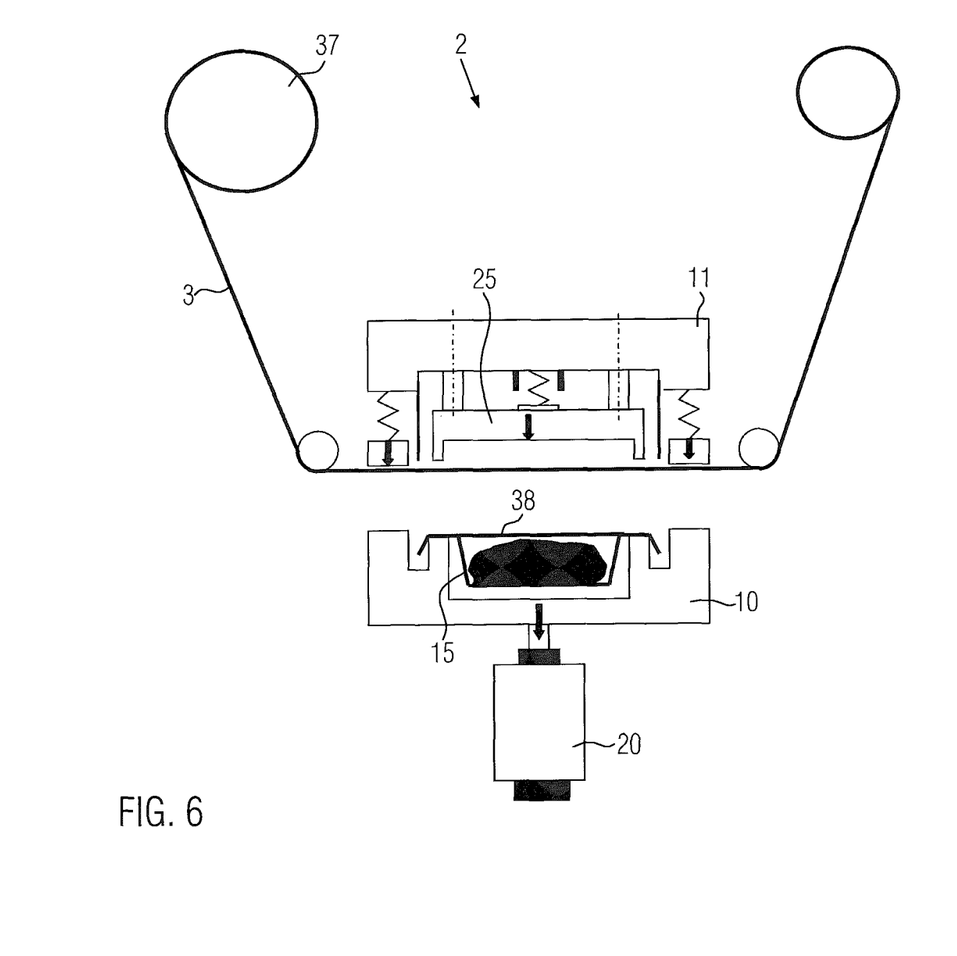
FIG. 6 is a schematic representation of the components of the sealing station with reopened sealing tools.

After releasing the optionally present and also optionally used brake 23, or immediately after reaching the upper final position, the damping unit 26 returns the potential energy stored in it in form of kinetic energy to the sealing plate 25 and the sealing tool lower part. This is illustrated in FIG. 6. The sealing plate 25 and the sealing tool lower part 10 therefore move downwardly. In this, FIG. 6 already shows a position in which the sealing tool lower part 10 and the sealing tool upper part 11 are separated from each other and from the top film 3. By sealing the top film 3 with the tray 15, a hermetically sealed packaging unit 38 was created. The region of the top film 3 not sealed with the tray 15 is wound onto the residual film winder 37. The sealed packaging unit 38 can be conveyed out of the sealing station 2 before a new cycle begins.

Figure 7:
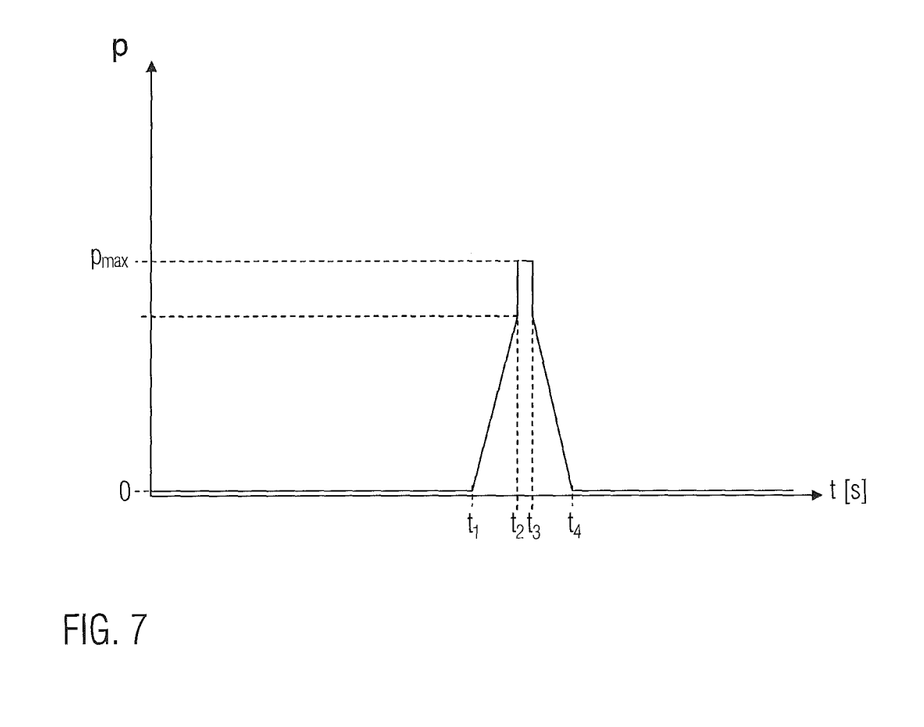
FIG. 7 is a representation of the sealing pressure in a distance-pressure diagram.

FIG. 7 schematically shows in a time-pressure diagram the development of the sealing pressure in the method according to the invention. In this, the x-axis shows the time, the y-axis the pressure acting upon the top film 3

Initially, the pressure is equal to zero, while the sealing tool lower part 10 moves upwardly. At time $t_1$, the intermediate position shown in FIG. 4 is reached, in which the tray edge 12 clamps the top film 3 between itself and the sealing plate 25. Then, the pressure on the top film 3 rises while that sealing tool lower part 10 continues to move upwardly and the sealing plate 25 must move against the damping unit 26. At time $t_2$, the final position shown in FIG. 5 is reached. At this time, the sealing plate 25 can move up no further. Nevertheless, the drive 19 and the sealing tool lower part 10 continue to press from below due to their inertia. Especially with an AC drive 20, the components have a comparatively high inertia. Due to this pressing from below, the sealing pressure rises sharply. Consequently, the sealing pressure at the time $t_2$ increases until a maximum value pmax is reached. Then, after depletion of the inertia and the resulting length of exposure, the sealing tool lower part 10 and the sealing plate 25 move downwardly, while the sealing pressure depletes slowly. The drive 19 supports this movement back to the starting position.

At the time $t_4$, the sealing plate 25 detaches from the sealed packaging unit 38 so that the sealing pressure returns to zero. The total sealing time, i.e., the minimum duration between the times $t_1$ and $t_4$ can be for example 100 to 300 ms. In this, the high sealing pressure between the times $t_2$ and $t_3$ can e.g. reach a duration of 40 to 70 ms. If a brake 23 is present and being used, the duration of this high sealing pressure can be prolonged by a duration that can be adjusted to a holding period. The maximum sealing pressure pmax can for a certain holding time be maintained until time $t_3$, in that the sealing tool lower part 10 is held in its upper final position by activating the brake 23.

An important advantage of the invention is that the force of the impact of the sealing tool lower part 10 together with the inertia of the components of the drive 19 is used for reaching a relatively high sealing force to respectively reduced the sealing time and thus increase the throughput of the sealing station 2 and the packaging machine 3 equipped therewith, respectively.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present invention. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A method for sealing at least a packaging unit, the method comprising the steps of:
   lifting a sealing tool lower part from a lowered position to a first intermediate position using a drive, the drive including a motor and a spindle integrated with said motor, wherein the lifting is effectuated by the motor rotating a spindle nut to cause linear displacement of the integrated spindle, wherein the spindle is operably coupled to the sealing tool lower part, and wherein the spindle nut is disposed relative to the motor so that a portion of the spindle penetrates the motor in said lowered position and said first intermediate position;
   clamping a packaging unit between the sealing tool lower part and a sealing plate, the sealing plate being disposed above the packaging unit;
   lifting said sealing tool lower part, said packaging unit, and said sealing plate from the first intermediate position to a final position by further rotating said spindle nut with said motor after said clamping step.

2. The method of claim 1, further comprising damping a movement of said sealing plate relative to a sealing tool upper part with a damping unit.

3. The method of claim 2, wherein the damping step includes increasing a damping force resisting said movement of said sealing plate relative to said sealing tool upper part sharply.

4. The method of claim 1, further comprising clamping a top film between said sealing tool lower part and a clamping frame prior to said sealing tool lower part reaching said intermediate position.

5. The method of claim 1, further comprising severing said top film during the lifting of said sealing tool lower part.

6. A sealing station for sealing at least a packaging unit, said sealing station comprising:
   a sealing tool lower part receiving a packaging unit;
   a sealing tool upper part;
   a sealing plate suspended from said sealing tool upper part by a damping unit and disposed for a movement relative to said sealing tool upper part; and a drive configured for actuating a lifting movement of said sealing tool lower part, said drive comprising a motor and a spindle integrated with said motor, said spindle having a first end and a second end, said first end penetrating at least a portion of said motor and said second end operably connected to said sealing tool lower part, said motor directly connected to a spindle nut, wherein rotation of said spindle nut by said motor raises and lowers said spindle;

wherein said sealing plate is configured for clamping said packaging unit between said sealing plate and said sealing tool lower part.

7. The sealing station of claim 6, wherein said drive executes said lifting movement in a uniform, continuous motion from a lowered position receiving said packaging unit, via an intermediate position in which said packaging unit is clamped between said sealing tool lower part and said sealing plate, to a final position in which said sealing tool lower part and said sealing plate are jointly lifted in relation to said intermediate position by said drive.

8. The sealing station of claim 7, wherein said damping unit applies a force that increases sharply in said final position.

9. The sealing station of claim 7, further comprising a stop for stopping the lifting movement of the sealing plate at said final position.

10. The sealing station of claim 6, wherein said damping unit comprises at least one of a spring element, a rubber-elastic element, an air damper, an air spring, or a hydraulic cylinder.

11. The sealing station of claim 6, further comprising a clamping frame moveable relative to said sealing tool upper part for clamping a top film between said sealing tool lower part and said clamping frame.

12. The sealing station of claim 11, wherein said clamping frame is elastically suspended from said sealing tool upper part.

13. The sealing station of claim 6, further comprising a guide member for guiding the movement of said sealing plate relative to said sealing tool upper part.

14. The sealing station of claim 6, further comprising a cutting knife for severing a top film coupled to said sealing tool upper part.

15. The sealing station of claim 6, wherein said motor is an asynchronous motor.

* * * * *